United States Patent [19]
Edelbach

[11] 4,172,669
[45] Oct. 30, 1979

[54] MIXING AND DISPENSING MACHINE

[75] Inventor: Loren C. Edelbach, Maple Grove, Minn.

[73] Assignee: The Cornelius Company, Anoka, Minn.

[21] Appl. No.: 928,760

[22] Filed: Jul. 27, 1978

[51] Int. Cl.² .............................................. B01F 7/04
[52] U.S. Cl. ................................ 366/172; 222/129.4; 222/333
[58] Field of Search ............... 366/168, 172, 177, 181, 366/160, 179, 173, 204, 205; 222/333, 129.1, 129.4

[56] References Cited
U.S. PATENT DOCUMENTS

| | | | |
|---|---|---|---|
| 2,806,678 | 9/1957 | Stevens et al. | 366/177 X |
| 3,207,079 | 9/1965 | Cook et al. | 222/333 X |
| 3,266,670 | 8/1966 | Brooks et al. | 222/129.4 X |
| 3,529,749 | 9/1970 | Lehmann et al. | 222/129.1 X |
| 3,568,887 | 3/1971 | Jabobs et al. | 222/129.4 X |
| 3,671,020 | 6/1972 | Krup | 222/129.4 X |

*Primary Examiner*—Billy S. Taylor
*Attorney, Agent, or Firm*—Henry C. Kovar

[57] ABSTRACT

A mixing and dispensing machine for combining fluid diluent and concentrate has a concentrate dispenser, a diluent line, a mixing device having a rotatable mixing impeller and into which the dispenser and diluent line direct ingredients, a single electric motor for driving both of the concentrate dispenser and the mixing device, a reduction gear box connecting the motor to the concentrate dispenser with a slip coupling, and a coupling connecting the motor directly to the mixing device; the coupling is an elongate tube of elastomeric material having a mass greater than the combined mass of the mixing impeller and its shaft and serves as a flywheel, dampener, thermal isolator and electrical isolator between the motor and the mixing device.

9 Claims, 1 Drawing Figure

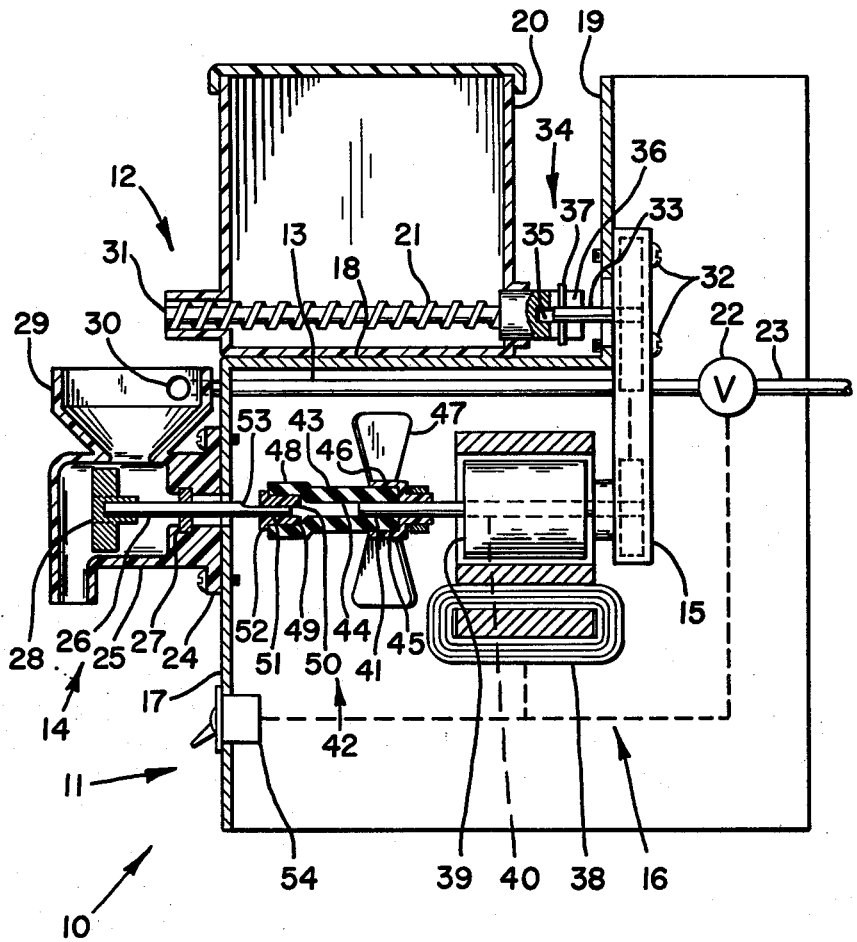

4,172,669

MIXING AND DISPENSING MACHINE

FIELD OF THE INVENTION

This invention pertains to a mixing and dispensing device for mixing a concentrate and a fluid diluent together into an edible fluid, and having an electric motor connected to drive both of a concentrate dispenser and a mixing device, and having an elastomeric coupling between the motor and the mixing device.

THE PRIOR ART

The prior dispensers have a first electric motor driving a concentrate dispenser through a reduction gear box and at relatively slow speed, and a second electric motor driving a relatively high speed mixing device.

The second electric motor has a cantilevered armature shaft and a mixing impeller mounted directly on the armature shaft. A fluid seal has been placed on the armature shaft between the impeller and the motor front bearing. In the event of seal failure, fluid has leaked into and destroyed the motor. The motor shaft presents a potential electric current in the mixing device and in fluid flowing therethrough. There has been no provision for impact absorption between the mixer and the motor, and the noise of the mixer and mixer motor, as well as the noise of the concentrate dispenser motor is excessive.

OBJECTS OF THE INVENTION

It is an object of the present invention to provide a mixing and dispensing machine having a single motor driving both of a concentrate dispenser and a mixing device.

It is an object of the present invention to provide a mixing and dispensing machine of less cost and compacted construction.

It is an object of the present invention to provide a mixing and dispensing machine having a mixing device and a drive motor electrically and thermally isolated from the mixing device, and which is quieter in operation.

SUMMARY OF THE INVENTION

In accordance with the principles of this invention, a mixing and dispensing machine has a concentrate dispenser, a fluid diluent line, a rotatable mixing device for accepting concentrate and diluent and mixing them together to form an edible fluid, and a single electric motor directly connected to the mixing device and to the concentrate dispenser through a reduction gear box for driving the concentrate dispenser at a much slower speed than the mixing device; a distinct further inventive aspect is an elastomeric tubular coupling between the electric motor and the mixing device.

ON THE DRAWING

The drawing is an elevational cross-sectional view of the preferred embodiment of a mixing and dispensing machine provided in accordance with the principles of the present invention.

AS SHOWN ON THE DRAWING

The principles of the present invention are particularly useful when embodied in a mixing and dispensing machine of the type illustrated in in the drawing and indicated by the numeral 10.

The machine 10 has a frame 11 to which is mounted a concentrate dispenser 12, a fluid diluent line 13, a mixing device 14 and a reduction gear box 15, and an electric motor 16.

The frame 11 has an upright lower front panel 17, a generally horizontal panel 18 extending rearward of and from the front panel 17, and an upright upper rear panel 19 extending upward from the horizontal panel 18. The panels 17, 18, 19 are in a general Z-shape as shown.

The concentrate dispenser 12 has a concentrate canister 20 mounted to the frame 11 and having an internal auger 21 which requires motive power for being revolved to dispense concentrate.

The diluent line 13 has a normally closed solenoid valve 22 and has an inlet end 23 which is connectible to a source of fluid diluent.

The mixing device 14 has a base 24 fastened to the frame 11, a mixing chamber 25, a rotatable impeller shaft 26 extending through the frame front panel 11, the base 24, a fluid seal 27 and into the mixing chamber 25. A mixing impeller 28 is co-rotatably mounted on and keyed to the impeller shaft 26. A funnel 29 is atop of the mixing chamber 25 and has the diluent line outlet 30, and is directly under the concentrate outlet 31.

An important feature of the machine 10 is the structure of the single motor 16 being connected to drive both of the concentrate dispenser 12 and the mixing device 14. The reduction gear box 15 is mounted and fastened to the upper rear panel 19 by removable fasteners 32. A cantilevered dispenser drive shaft 33 extends forward of the gear box 15 and through the rear panel 19. A slidably connectible coupling 34 connects the drive shaft 35 to the concentrate dispenser 12. The auger 21 has an internal bore 35 and a cross-slot 36 into which the drive shaft 33 and cross-pin 37 in the drive shaft 33 respectively fit for positive rotational connection.

The electric motor 16 is unitized to the gear box 15 in integral construction. The gear box 15 is positioned to the rear of the rear panel 19 and the motor 16 is suspended from the gear box 15 and under the horizontal panel 18 and forward of the plane of the rear panel 19, balancing the suspended load on the rear panel 19.

The electric motor 16 includes a stator 38 rigidly mounted to the gear box 15 and a rotatable armature 39 mounted to a co-rotatable armature shaft 40. The armature shaft 40 has a cantilevered forward extending end forming a mixer drive shaft 41.

Another and distinct important feature of the machine 10 is the coupling 42 connecting the motor 16 to the mixing device 14. The coupling 42 has an elongate length of elastomeric rubber 43 preferably in tubular form. A prefered elastomeric material is neoprene of 70±5 durometer Shore A. The tube 43 has an internal bore 44 on the motor end 45 which is smaller in diameter than the mixer drive shaft 41. The motor end 45 is frictionally held, both axially and rotationally on the mixer drive shaft 41 by virtue of an interference fit between the bore 44 and the shaft 41, and is enclosed by the concave hollow rigid hub 46 of a motor cooling fan 47. The mixer end 48 of the coupling 42 has a rigid sleeve 49 of nylon or other relatively low friction bearing material mounted within and to the elastomeric tube 43. The sleeve 49 is positively rotationally indexed to the shaft 26 by a flatted non circular internal bore 50 rotationally keyed to and axially slidable upon a correspondingly flatted end 51 of the mixer shaft 26 slip fitted in the coupling sleeve bore 50. A shoulder 52 on the sleeve 49 is normally spaced from a corresponding shoulder 53 on shaft 26, but the shoulders 52, 53 are abuttable against each other for preventing the coupling 42 from working forward off of the mixer drive shaft 41.

The elastomeric coupling tube 43 has a substantially constant wall section, a specific example of which is 6.5 mm thick. The coupling mixer end 48 has larger internal and external diameters than the motor end 45 and therefor has more rotational inertia at the mixer end 48 than at the motor end 45.

The elastomeric tube 43 is of significantly greater mass than the combined mass of the impeller 28 and impeller shaft 26. A specific preferred construction is 26 gm for the tube 43 and 13 gm for impeller 28 and shaft 26 or a two-to-one ratio. The elastomeric tube 43 has a much greater moment of rotational inertia than both of the impeller 28 and shaft 26 and serves as a flywheel and damper for the impeller 28 during rotation. The coupling 42 cannot work off of its drive shaft 41 because the shoulders 52, 53 would abut against each other and limit movement of the coupling 42. The slip fit between the mixer shaft end 51 and the sleeve 49 allows sliding for absorbing thermal expansion of the coupling 42 and axial displacement of the motor shaft 40 armature 37. An electric switch 54 is connected to the diluent valve 22 and the electric motor 16. The switch 54 may be manual, timer or coin actuatable.

In operation and use of the machine 10, the switch 54 is closed and the valve 22 is opened and the motor 16 begins to run. Concentrate is dispensed into the funnel 29 and washed into the mixing chamber 25 by diluent from the line 13.

Specific diluents are hot water or cold water; specific concentrates are powdered chocolate, powdered mashed potato, powdered french fry mix, instant grits, powdered gravy, cheese, soup, and other dry base concentrates. The concentrate dispenser 12 may alternatively be a fluid pump and fluid concentrates such as chocolate and juice may be dispensed.

The mixing impeller 28 thoroughly mixes the concentrate and diluent together and the thus prepared edible fluid is dispensed out of the mixing chamber 25 and into a cup.

The coupling 42 serves as a flywheel, shock absorber, thermal isolator, and electrical isolator between the motor 16 and the mixing device 14.

Assembly and serviceability of the machine is improved as all of the operating components are easily and individually removed. The concentrate dispenser 12 is merely slid forward for removal. The mixing device 14 is removed by unfastening the base 24 and withdrawing the mixer shaft 26 from the coupling 42 and leaving the concentrate dispenser 12, gear box 15, motor 16 and coupling 42 in the machine and still operative. There is no need for removal of a motor or any electrical disconnection for removal of either of the concentrate dispenser 12 or mixing device 14. In the event of motor 16 or gear box 15 failure, the gear box fasteners 32 are removed and the gear box 15 and motor 16 are together slid rearwardly for removal. During this removal, the concentrate drive coupling 34 slidably disconnects and the mixer coupling 42 disconnects as the sleeve 49 slides off the mixer shaft end 51. The entire drive consisting of gear box 15, motor 16 and coupling 42 is then removable as a unit.

Although other advantages may be found and realized, and various and minor modifications suggested by those versed in the art, be it understood that I wish to embody within the scope of the patent warranted hereon, all such embodiments as reasonably and properly come within the scope of my contribution to the art.

I claim as my invention:

1. In a mixing and dispensing machine for combining concentrate and fluid diluent and forming an edible fluid therefrom, having
   (a) means for dispensing a concentrate;
   (b) means for dispensing a fluid diluent to be combined with the concentrate;
   (c) a mixing device for accepting and mixing together the concentrate and diluent and forming an edible fluid therefrom, said mixing device having
      (1) a rotatable mixing impeller, and
      (2) a co-rotatable impeller shaft upon which the impeller is mounted; and
   (d) an electric motor for rotatably driving the mixing impeller, said motor having a mixer drive shaft co-axial with and spaced axially from the impeller shaft;

the improvement comprising: an elastomeric coupling rotatably connecting the mixer drive shaft to the impeller shaft, said coupling having an elastomeric mass rotatable by said motor and connecting said shafts which is greater than the combined mass of the impeller and impeller shaft.

2. In an improved mixing and dispensing machine according to claim 1,
   (a) means connecting said coupling to said mixer drive shaft both axially and rotationally, for axial location and retention of the coupling to the drive shaft and for rotational driving of the coupling by the drive shaft; and
   (b) axial slidable non-circular means connecting the coupling to the impeller shaft in rotationally keyed relationship, for positive rotational connection of the impeller shaft to the coupling and for free axial sliding connection of the coupling on the impeller shaft.

3. In an improved mixing and dispensing machine according to either of claims 1 or 2, a rigid slip coupling sleeve within and fixed to the elastomeric coupling and drivingly connected to the impeller shaft, said rigid sleeve being of a relatively low friction bearing material and having a non-circular bore slidably fitted upon a non-circular end of the impeller shaft.

4. A mixing and dispensing machine according to claim 1, in which the coupling is axially overlapped on the mixer drive shaft and enclosed within a rigid hub mounted on the mixer drive shaft.

5. A mixing and dispensing machine according to claim 4, in which the coupling is enclosed with a rigid hub of a motor cooling fan.

6. In a mixing and dispensing machine for combining concentrate and liquid diluent and forming an edible fluid therefrom, having
   (a) a frame,
   (b) means mounted on the front side of the frame for dispensing a concentrate, said means requiring motive power for dispensing,
   (c) means for dispensing a liquid diluent to be combined with the concentrate, and
   (d) a mixing device mounted on the front side of the frame for accepting and mixing together the concentrate and diluent and forming the edible fluid therefrom, said mixing device having an impeller shaft rotatable about a generally horizontal axis and also requiring motive power;

the improvement of a single drive for both of the dispenser and the mixing device, which is removable as a unit from the machine and which comprises:

(1) a unitary construction reduction gear box and single electric motor which as a unitary unit are removably mounted to the rear side of the frame, said gear box having a relatively slow output speed dispenser drive shaft and said motor having a relatively high speed mixer drive shaft parallel to the dispenser drive shaft and co-axial with and spaced rearward of the impeller shaft, said mixer drive shaft being co-rotatable with an armature of the motor, (2) a first slidably connectable slip coupling rotatably connecting the gear box drive shaft to the concentrate dispenser for rotational power of the dispenser at substantially less than the speed of the motor, and (3) a second slidably connectable slip coupling rotatably connecting the mixer drive shaft and the motor armature directly to the mixing device impeller shaft for rotatably driving the impeller shaft at the relatively high armature speed of the gear box motor concurrent with rotational power of the dispenser at the lesser speed, said second slip coupling being an elastomeric member having a first end which is both axially and rotationally fastened to one of the mixer drive shaft and the impeller shaft, and a second end with a non-circular bore rotationally keyed to and axially slidably fitted upon the other of the mixer drive shaft and the impeller shaft, said elastomeric coupling being slidably separable from the other shaft while being retained upon the first shaft when the gear box and motor unit are removed from the dispensing machine.

7. The mixing and dispensing machine improvement of claim 6 in which the second coupling is a length of tubing having its internal bore friction fitted on to the mixer drive shaft, said second coupling including a rigid coupling sleeve in the mixer end of the tubing, said sleeve having therein the non-circular bore slidably keyed to the impeller shaft.

8. The mixing and dispensing machine improvement of either of claims 6 or 7, including a rotatable mixing impeller upon the impeller shaft, said second coupling having a rotatable elastomeric mass greater than the combined mass of the impeller and the impeller shaft.

9. A mixing and dispensing machine according to any one of claims 1, 2, 4, 5, 7 or 8 in which the coupling has a significantly greater moment of rotational inertia than the combined rotational moment of inertia of the impeller and the impeller shaft.

* * * * *